United States Patent
Colvin et al.

(10) Patent No.: US 9,458,900 B2
(45) Date of Patent: Oct. 4, 2016

(54) PRESSURE CONTROLLED DRIVELINE MECHANICAL COUPLING

(71) Applicant: Ford Global Technologies, LLC, Dearborn, MI (US)

(72) Inventors: Daniel Scott Colvin, Farmington Hills, MI (US); Bernard D. Nefcy, Novi, MI (US); Marvin Paul Kraska, Dearborn, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/854,547

(22) Filed: Sep. 15, 2015

(65) Prior Publication Data

US 2016/0003314 A1    Jan. 7, 2016

Related U.S. Application Data

(62) Division of application No. 13/329,785, filed on Dec. 19, 2011, now Pat. No. 9,145,049.

(51) Int. Cl.
| | |
|---|---|
| *G06F 19/00* | (2011.01) |
| *F16D 48/06* | (2006.01) |
| *F16D 48/08* | (2006.01) |
| *B60K 6/48* | (2007.10) |
| *B60W 10/02* | (2006.01) |
| *B60W 20/00* | (2016.01) |
| *F16H 61/00* | (2006.01) |
| *B60L 15/20* | (2006.01) |

(52) U.S. Cl.
CPC ............... *F16D 48/066* (2013.01); *B60K 6/48* (2013.01); *B60L 15/2054* (2013.01); *B60W 10/02* (2013.01); *B60W 20/00* (2013.01); *F16D 48/08* (2013.01); *F16H 61/0031* (2013.01); *B60K 2006/4825* (2013.01); *B60W 2510/0275* (2013.01); *B60W 2710/023* (2013.01); *B60Y 2400/406* (2013.01); *F16D 2500/1066* (2013.01); *F16D 2500/3024* (2013.01); *F16D 2500/501* (2013.01); *F16D 2500/50224* (2013.01); *Y02T 10/6221* (2013.01); *Y02T 10/6252* (2013.01); *Y02T 10/7258* (2013.01); *Y10S 903/914* (2013.01); *Y10S 903/946* (2013.01)

(58) Field of Classification Search
CPC ................. F16D 48/066; F16D 48/08; F16D 2500/50224; F16D 2500/1066; F16D 2500/3024; F16D 2500/501; B60L 15/2054; B60W 20/00; B60W 2710/023; B60W 2510/0275; F16H 61/0031; B60Y 2400/406
See application file for complete search history.

(56) References Cited

U.S. PATENT DOCUMENTS

| | | | |
|---|---|---|---|
| 5,527,238 | A | 6/1996 | Hrovat et al. |
| 5,835,875 | A | 11/1998 | Kirchhoffer et al. |
| 6,176,808 | B1 | 1/2001 | Brown et al. |
| 6,805,647 | B2 | 10/2004 | Silveri et al. |
| 8,155,848 | B2 | 4/2012 | Kobayashi et al. |
| 8,544,624 | B2 | 10/2013 | Grethel |

(Continued)

*Primary Examiner* — David J Hlavka
(74) *Attorney, Agent, or Firm* — James Dottavio; Brooks Kushman P.C.

(57) ABSTRACT

A vehicle includes a motive power source, a transmission, and a clutch system. The vehicle further includes a controller that causes the clutch system to generate a generally constant clutch pressure to mechanically couple the motive power source and transmission as a line pressure associated with the transmission varies.

6 Claims, 2 Drawing Sheets

(56) References Cited

U.S. PATENT DOCUMENTS

| | | | |
|---|---|---|---|
| 9,080,618 B2* | 7/2015 | Kawakami | F16D 48/02 |
| 2009/0074590 A1 | 3/2009 | Tsuda | |
| 2009/0242290 A1 | 10/2009 | Kobayashi | |
| 2009/0272616 A1* | 11/2009 | Wilson | F16D 48/066 |
| | | | 192/85.63 |
| 2010/0075798 A1* | 3/2010 | Suzuki | B60K 6/40 |
| | | | 477/5 |
| 2010/0211229 A1* | 8/2010 | Hinami | F15B 21/087 |
| | | | 700/282 |
| 2011/0070999 A1 | 3/2011 | Soliman et al. | |
| 2012/0296509 A1* | 11/2012 | Wakita | B60W 10/06 |
| | | | 701/22 |
| 2013/0018557 A1* | 1/2013 | Wilson | F16H 61/06 |
| | | | 701/67 |
| 2013/0213760 A1* | 8/2013 | Wilson | F16D 48/066 |
| | | | 192/85.63 |
| 2014/0129104 A1* | 5/2014 | Park | F16D 48/06 |
| | | | 701/68 |

\* cited by examiner

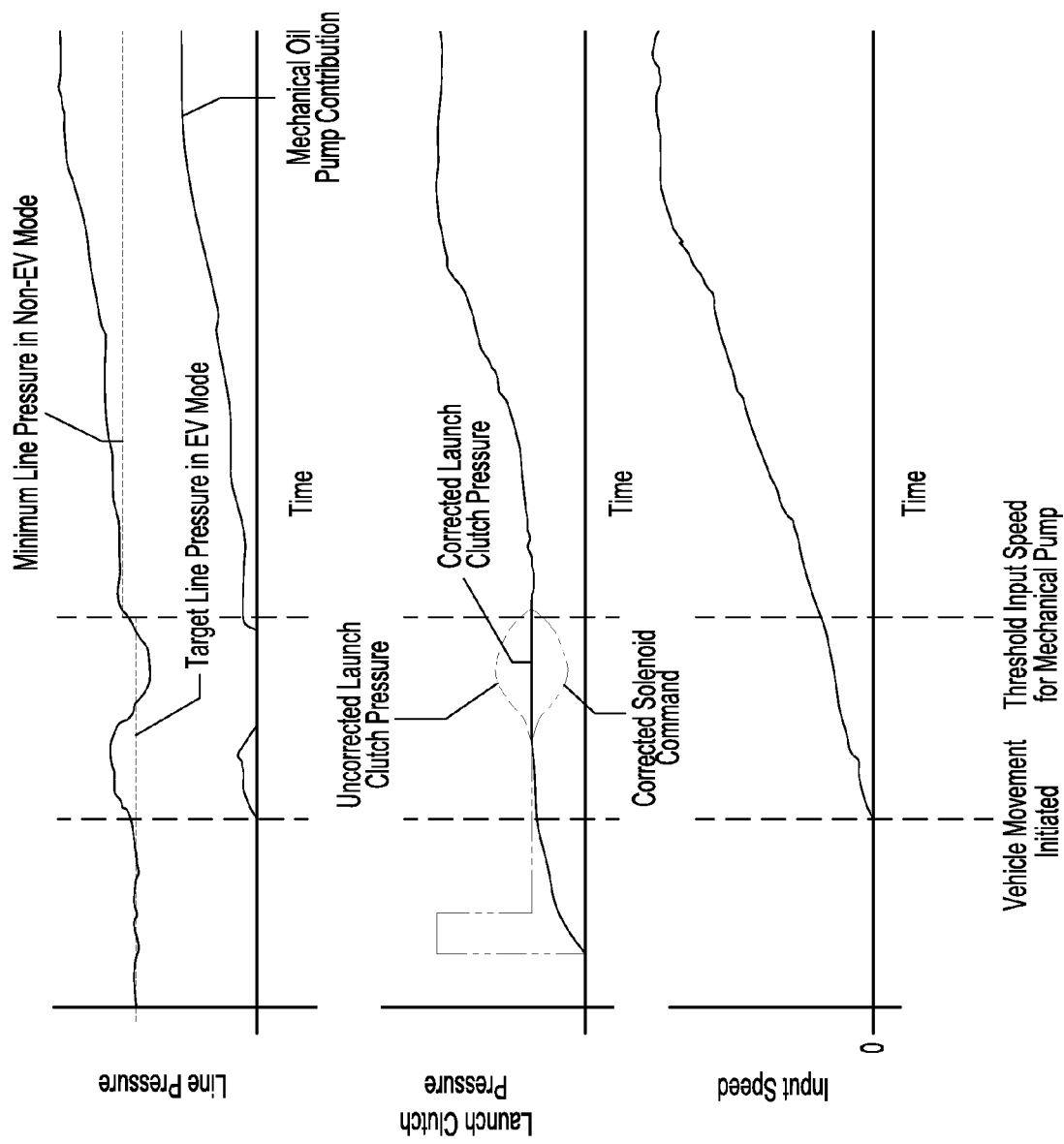

PRESSURE CONTROLLED DRIVELINE MECHANICAL COUPLING

CROSS-REFERENCE TO RELATED APPLICATION

This application is a divisional of application Ser. No. 13/329,785, filed Dec. 19, 2011, the disclosure of which is hereby incorporated in its entirety by reference herein.

TECHNICAL FIELD

This disclosure relates to the control of mechanical coupling devices, such as clutches, for shafts or other elements of a vehicle driveline.

BACKGROUND

Certain road vehicles may be driven by an internal combustion engine and/or an electric machine. An electric machine, for example, may be used to drive a vehicle at low speeds. An internal combustion engine and the electric machine may be used to drive the vehicle at high speeds. If the internal combustion engine and electric machine are arranged along a common driveline so as to share a common input shaft to a transmission, a clutch may be used to isolate the internal combustion engine from the electric machine. A clutch may also be used to isolate the internal combustion engine and electric machine from the transmission. Certain clutch control strategies may ensure a smooth transition from one source of motive power to another.

SUMMARY

A clutch system may be controlled by providing a current to the clutch system to mechanically couple an electric machine and transmission based on a target clutch pressure and a line pressure associated with the transmission, receiving data about an actual clutch pressure, and altering the current based on the data to keep the actual clutch pressure substantially equal to the target clutch pressure as the line pressure varies.

BRIEF DESCRIPTION OF THE DRAWINGS

FIG. 2 is a plot of transmission line pressure versus time.
FIG. 3 is a plot of launch clutch pressure versus time.
FIG. 4 is a plot of input speed for a mechanical oil pump versus time.

DETAILED DESCRIPTION

Figure 1:
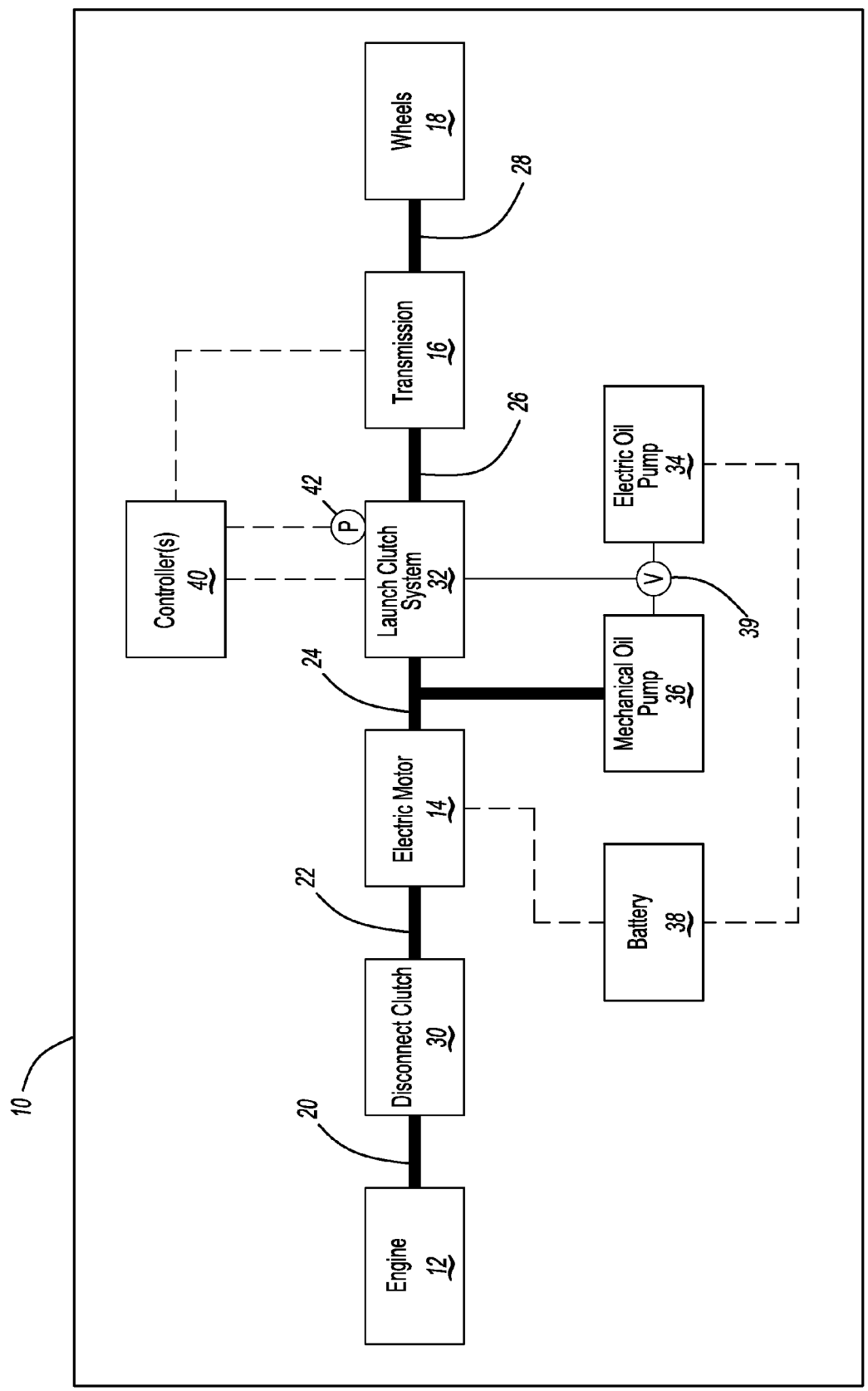
FIG. 1 is a block diagram of a vehicle.

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Referring to FIG. 1, an automotive vehicle 10 may include an engine 12, electric machine 14, transmission 16, and wheels 18. The engine 12 may include an output shaft 20, the electric machine 14 may include input and output shafts 22, 24, and the transmission 16 may include input and output shafts 26, 28. A disconnect clutch system 30 is arranged to mechanically couple the shafts 20, 22 so as to mechanically couple the engine 12 and electric machine 14. A launch clutch system 32 is arranged to mechanically couple the shafts 24, 26 so as to mechanically couple the electric machine 14 and transmission 16. The launch clutch system 32, in other embodiments, may include a torque converter and lock up clutch in parallel with each other. Other arrangements are also contemplated.

The engine 12 and/or electric machine 14 may be used to drive the wheels 18 via the transmission 16. Beginning from a stop, for example, the disconnect clutch system 30 may be disabled to isolate the shafts 20, 22 from each other, the launch clutch system 32 may be enabled to lock the shafts 24, 26 together, and the electric machine 14 may be activated to cause the wheels 18 to move. As a demand for acceleration increases, the launch clutch system 32 may be caused to slip and the disconnect clutch system 30 may be enabled to lock the shafts 20, 22 together. The engine 12 may then be started and brought up to a desired speed. The amount of slip experienced by the launch clutch system 32 may then be reduced as the speed of the shafts 20, 22, 24 approaches the speed of the shaft 26.

The transmission 16 is serviced by an electric oil pump 34 and a mechanical oil pump 36. The electric machine 14 and electric oil pump 34 are powered by electrical energy stored in a battery 38. The mechanical oil pump 36 is powered by mechanical energy obtained from the rotation of the output shaft 24. The electric oil pump 34 is intended to provide oil to the transmission 16 under circumstances in which a rotative speed of the output shaft 24 is not sufficient to provide threshold mechanical energy for proper operation of the mechanical oil pump 36.

A check valve 39 may regulate the flow of oil from the electric and mechanical oil pumps 34, 36. In the example of FIG. 1, the check valve 39 is configured such that oil from the electric oil pump 34 will flow to the transmission 16 if a pressure of oil from the mechanical oil pump 36 is less than that of the oil from the electric oil pump 34 (assuming the electric oil pump 34 is active). If the pressure of the oil from the mechanical oil pump 36 is greater than that of the oil from the electric oil pump 34 (assuming the electric oil pump 34 is active), the oil from the electric oil pump 34 will not flow to the transmission 16.

A controller system 40 is operatively arranged with the transmission 16 and launch clutch system 32. That is, the control system 40 may read information associated with the transmission 16 and operate the launch clutch system 32 on the basis thereof. For example, a solenoid and valve (not shown) of the launch clutch system 32 that control clutch pressure to mechanically couple the shafts 24, 26 may be controlled based on a line pressure from the transmission 16 to the launch clutch system 32.

The line pressure is proportional to the oil pressure supplied to the transmission 16 by the electric and/or mechanical oil pumps 34, 36. Transitioning from the electric oil pump 34 to the mechanical oil pump 36 as described above (and/or changes in a state of the transmission 16, such as a concurrent gear shift, etc.) may cause fluctuations in the oil pressure to the transmission 16 and hence, in the line pressure that influences operation of the solenoid and valve (not shown). Drivability issues may occur if these transitory events take place during a zero speed launch of the vehicle 10 that includes a pull up of the engine 12 as the actual line pressure may deviate from its target. Such deviations may cause a torque being transmitted to the wheels 18 to be altered in an undesirable fashion.

Referring now to FIGS. 2, 3 and 4, the line pressure associated with the transmission 16, launch clutch pressure of the launch clutch system 32, and input speed to the mechanical oil pump 36 are plotted versus time. (The time axis is not necessarily to scale.) Prior to the vehicle movement initiated event, it is assumed that the engine 12 is off, the line pressure results from operation of the electric oil pump 34, and a demand for vehicle movement is initiated (e.g., a driver steps on an accelerator pedal (not shown)). In response to the demand for vehicle movement, the controller system 40 generates a current for the solenoid (not shown) of the launch clutch system 32 based on the line pressure. The pressure generated by the launch clutch system 32 increases toward a target as a result.

As vehicle movement begins, the input speed to the mechanical oil pump 36 increases because the shaft 24 begins to rotate. The mechanical oil pump 36 may begin to operate and thus influence the line pressure. Certain mechanical oil pumps may require some minimum threshold input speed to provide steady output. Such a threshold input speed for the mechanical oil pump 36 is indicated in FIGS. 2, 3 and 4. Below this threshold, the mechanical oil pump 36 may not provide steady output. As a result, the line pressure may deviate considerably from its target between the time when vehicle movement is initiated and the threshold input speed for the mechanical pump 36 is achieved. This may result, as mentioned above, in undesirable variations in torque transmitted to the wheels 18.

Variations in the line pressure may result in variations in the launch clutch pressure (as indicated by dashed line) because the current provided to the solenoid (not shown) of the launch clutch system 32 is based on the line pressure. That is, a magnitude of the current provided to the solenoid depends on a magnitude of the line pressure. It has been discovered, however, that information about the launch clutch pressure may be used to modify/alter/select the magnitude of the current to the solenoid of the launch clutch system 32 to minimize variations in the launch clutch pressure caused by variations in the line pressure.

Referring again to FIG. 1, a pressure sensor 42 is operatively arranged with the launch clutch system 32 so as to be able to detect the launch clutch pressure and is in communication with the controller system 40. The controller system 40 may thus use this pressure information as a basis for which to further control the launch clutch system 32. The demand for vehicle movement, for example, may cause the controller system 40 to select a desired launch clutch system pressure and line pressure (and read associated data such as temperature, etc.) as known in the art. On the basis of this information, the controller system 40 may select a corresponding magnitude for current to be supplied to the solenoid (not shown) of the launch clutch system 32. In certain examples, lookup tables mapping the desired clutch pressure, temperature data, and current magnitude may be used to facilitate the selection. Each of the lookup tables may correspond with a range of desired line pressures. That is, a first lookup table associated with desired line pressures less than a minimum threshold line pressure for non-electric vehicle mode may map values for the desired clutch pressure, temperature data, and current magnitude with each other. A second lookup table associated with desired line pressures greater than the minimum threshold and less than a feed pressure for the valve (not shown) of the launch clutch system 32 may map values for the desired clutch pressure, temperature data, and current magnitude with each other. A third lookup table associated with desired line pressures greater than the feed pressure may map values for the desired clutch pressure, temperature data, and current magnitude with each other. Hence, the desired line pressure determines which of the lookup tables to use. A value for the current magnitude, in other examples, may be obtained by aggregating data between the lookup tables. For a desired line pressure below the minimum threshold and any given desired clutch pressure and temperature, for example, the current magnitude may be found by aggregating (e.g., interpolating) the selected values from the first and second tables. Any suitable/known technique, however, may be used to determine the magnitude for the current.

The controller system 40 may determine (periodically, continuously, etc.) whether the actual launch clutch pressure deviates from the desired launch clutch pressure. If the actual deviates from the desired, the controller system 40 may alter the current magnitude selected, in this example, from the lookup tables described above. The controller system 40 may reduce the selected current if the actual launch clutch pressure is greater than the desired launch clutch pressure until the actual and desired pressures are substantially equal. Referring to FIG. 2, an example of such a corrected current magnitude and corresponding corrected actual pressure are illustrated in phantom and solid lines respectively. If the actual launch clutch pressure is less than the desired launch clutch pressure, the controller system 40 may increase the selected current until the actual and desired pressures are substantially equal, etc.

The controller system 40 may thus learn via the above algorithm the amount by which to alter the selected current based on the amount by which the actual launch clutch pressure deviates from its target. If subsequent variations in launch clutch pressure are observed as the threshold input speed to the mechanical pump 36 continues to increase, the controller system 40 may correct the current magnitude based on the information learned without having to perform closed loop control based on data from the pressure sensor 42. This learned information, however, may only be valid for a particular instance of a transition from electric vehicle mode to non-electric vehicle mode. Subsequent vehicle launches and/or transitions may each require the closed loop control to be performed to correctly calibrate the system for that launch and/or transition.

Once the threshold input speed for the mechanical pump 36 is achieved, the line pressure should take on values at least equal to the minimum threshold line pressure for non-electric vehicle mode, the launch clutch pressure should continue to increase towards its final target (to lock the shafts 24, 26), and the input speed to the mechanical pump 36 should continue to increase and allow the launch clutch system 32 to reach maximum torque capacity as the speed of the shaft 24 increases with the engine speed.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method comprising:
    by a controller,
        generating and outputting a command to provide current to a clutch system to mechanically couple an electric machine and transmission based on received data indicative of a target clutch pressure and transmission line pressure; and
        altering the command based on received data indicative of actual clutch pressure such that the actual clutch pressure is maintained equal to the target clutch pressure as the transmission line pressure varies.

2. The method of claim 1 further comprising selecting the target clutch pressure based on the data indicative of the transmission line pressure.

3. The method of claim 1, wherein the line pressure varies due to activation of a mechanical oil pump while an electric oil pump is on.

4. A vehicle system comprising:
    a controller configured to
        generate and output a command to provide current to a clutch system to mechanically couple an electric machine and transmission based on received data indicative of a target clutch pressure and transmission line pressure, and
        alter the command based on received data indicative of actual clutch pressure such that the actual clutch pressure is maintained equal to the target clutch pressure as the line pressure varies.

5. The vehicle system of claim 4, wherein the controller is further configured to select the target clutch pressure based on the data indicative of the transmission line pressure.

6. The vehicle system of claim 4, wherein the line pressure varies due to activation of a mechanical oil pump while an electric oil pump is on.

* * * * *